Patented May 17, 1938

2,117,414

UNITED STATES PATENT OFFICE 2,117,414

METHOD OF PRODUCING ISOPULEGOL

Hugh B. Glass, Birmingham, Ala., assignor, by mesne assignments, to Theodore Swann, Birmingham, Ala.

No Drawing. Application September 28, 1936, Serial No. 102,918

11 Claims. (Cl. 260—153)

This invention relates to the conversion of citronellal to isopulegol, and has for its principal object the provision of such a process which shall be simple and easily carried out and whereby satisfactory yields may be obtained.

As is known, citronellal obtained by fractional distillation of citronella oil, is a mixture of aldehydes (Simonsen, "The Terpenes", 1931 Ed.), represented by the formulae.

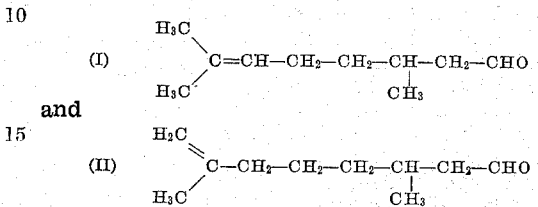

Isopulegol is a substance which may be obtained from Formula II. Upon hydrogenation by known methods, it produces, among other products, crystalline U. S. P., (XI) Menthol. Such menthol is optically active, being laevorotatory, having a specific laevo rotation of —45° to —50° (Na$_D$ line). Isopulegol has not been found to occur in nature, but has heretofore been produced in the laboratory principally by heating citronellal with acetic acid or acetic anhydride to produce isopulegol and/or isopulegol acetate, and also menthone. Isopulegol acetate upon hydrolysis yields isopulegol. The yields by this method are very low, due to the predominance of side reactions producing heavier cyclic compounds.

In 1931, Kuwata reported (J. Soc. Chem. Ind. Japan 34, 70-2B) that upon heating citronellal with "Japanese acid clay" a violent exothermic reaction occurred, from which he isolated a large number of chemical compounds, not all of which were identified, and 32% of the theoretical amount of isopulegol. While this yield is higher than can be obtained by the treatment of citronellal with acetic acid or acetic anhydride, or other acids, it is still too low a yield to serve as a means for a commercial source of menthol.

The difficulty of the problem has been to find a vehicle to bring about the conversion to isopulegol, without at the same time causing the formation of undesired compounds. Of the many reactions which may occur, it is necessary for a commercially feasible process, that the conversion to isopulegol take place in preference to other possible reactions.

In my investigation of the problem I have made experiments similar to those reported by Kuwata and have produced substantially the same results as there reported. I have also found that such substances as ferric oxide, finely divided Missouri silica, kaolin, New Jersey green sand, and ordinary clay, produce almost identically the same type of reaction as that described by Kuwata. In all of these experiments, however, the yields of isopulegol were lower than required for a commercial process. Pure silica apparently produces no change on citronellal when mixed therewith and heated.

I have discovered that commercial silica gel, when mixed with citronellal and heated, brings about a conversion in which 90% and better of the theoretical yield of isopulegol is obtained. Commercial silica gel contains metallic impurities including approximately five parts per million of Fe$_2$O$_3$. While I am not sure as to the identity of the impurity or impurities which bring about the catalytic action of the silica gel, I have found that when it has been leached with acid, its catalytic activity is greatly reduced.

In carrying out my improved process, I prefer to proceed as follows:

The citronellal is placed in a conversion kettle having temperature control means, such as coils or a jacket. I then add commercial silica gel preferably ground to around 200 mesh in an amount equivalent to approximately 5% of the weight of the citronellal. The silica gel should be water free before use, and should not be exposed to the air before use any longer than is absolutely necessary. A fairly rapid stream of dry carbon dioxide, or other oxygen free gas which has no deleterious effect on the contents of the kettle, should now be introduced into the bottom of the kettle, the kettle hatch closed and all air swept out. Agitation and heat are next applied. As soon as the temperature reaches 105° C., the CO$_2$ gas should be dampened by allowing it to flow over water before going into the kettle. I have found that the reaction sought occurs at around 135° C., and care should be exercised to prevent the temperature of the reaction getting above 140° C. After the reaction has begun, the rate of CO$_2$ flow may be decreased until only a very slow flow of gas is had. The bent end of the pipe from the kettle should be under water to prevent back flow of the air.

The reaction may be considered as complete when the refractive index, Na$_D$ line, at 20° is from 1.4721 to 1.4728, when the aldehyde content shall have been reduced to 2% or less. The reaction time is from 4 to 15 hours, depending upon the amount and particle size of the silica gel employed.

Generally speaking, the greater the amount and the more finely divided the silica gel employed, the faster the reaction. If the reaction is allowed to become too violent, undesirable side reactions occur which greatly decrease the yield of isopulegol.

The silica gel may be employed several times without treatment and without material loss of power. It may be reactivated by freeing it of organic material and by heating to 500° F. and up for a sufficient time to drive off all moisture.

After the reaction is complete, the silica gel is allowed to settle to the bottom while the material is cooling. The resulting mixture is then decanted and hydrogenated by known methods, whereupon the isopulegol produces menthol which may be separated and refined by methods which form no part of my present invention.

While I have described but one method of carrying out my invention, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The method of producing isopulegol from citronellal which comprises heating citronellal with finely divided commercial silica gel.

2. The method of producing isopulegol from citronellal which comprises heating citronellal with finely divided commercial silica gel and excluding air from contact with the mixture while the reaction is going on.

3. The process of producing isopulegol from citronellal which comprises adding to the citronellal finely divided silica gel containing ferric oxide as an impurity, heating the mixture to 135° C., excluding air from contact with the mixture, and stirring while the reaction is going on.

4. The process of producing isopulegol from citronellal which comprises adding to the citronellal about 5% of its weight of finely divided silica gel containing ferric oxide as an impurity, heating the mixture to a temperature of from 130° to 140° C., excluding air from contact with the mixture, and agitating while the reaction is going on.

5. The process of producing isopulegol from citronellal which comprises adding to the citronellal about 5% of its weight of finely divided silica gel containing ferric oxide as an impurity, heating the mixture to a temperature of from 130° to 140° C., agitating the mixture, and passing a stream of oxygen free gas therethrough while the reaction is going on.

6. The method of producing isopulegol from citronellal which comprises adding finely divided moisture free commercial silica gel to citronellal, excluding air from contact with the mixture, maintaining the temperature of the mixture at around 135° C., and stirring to maintain the silica gel in suspension while the reaction is going on.

7. A process as defined in claim 6, in which the silica gel contains ferric oxide as an impurity.

8. A process as defined in claim 6, in which air is excluded by passing a stream of an inert oxygen free gas through the reaction zone.

9. A process as defined in claim 6, in which a stream of carbon dioxide is passed through the reaction zone while the reaction is going on, said carbon dioxide being moistened after the reaction has started.

10. The method of producing isopulegol from citronellal which comprises adding finely divided moisture free commercial silica gel to citronellal, excluding air from contact with the mixture, maintaining the temperature of the mixture at around 135° C., and stirring to maintain the silica gel in suspension until the aldehyde content of the mixture is reduced to around 2%.

11. The method of producing isopulegol from citronellal which comprises adding finely divided moisture free commercial silica gel to citronellal, excluding air from contact with the mixture, maintaining the temperature of the mixture at around 135° C., and stirring to maintain the silica gel in suspension until the refractive index at 20° Na$_D$ line is from 1.4721 to 1.4728.

HUGH B. GLASS.